United States Patent [19]

Ishiwata et al.

[11] 4,042,667

[45] Aug. 16, 1977

[54] METHOD OF CLEANING WASTE GAS CONTAINING A FLUORINE COMPONENT

[75] Inventors: Shosuke Ishiwata, Ibaragi; Kaoru Ozaki, Chigasaki, both of Japan

[73] Assignee: Asahi Fiber Glass Company Limited, Tokyo, Japan

[21] Appl. No.: 569,144

[22] Filed: Apr. 17, 1975

[51] Int. Cl.$^2$ ............................................. B01D 53/34
[52] U.S. Cl. .................................. 423/240; 423/490; 55/71; 55/97
[58] Field of Search ............... 423/240, 241, 489, 490; 55/71, 97; 204/67

[56] References Cited

U.S. PATENT DOCUMENTS

| | | | |
|---|---|---|---|
| 2,919,174 | 12/1959 | Pling | 423/240 |
| 3,343,908 | 9/1967 | Wickert | 423/244 |
| 3,933,978 | 1/1976 | Margraf | 423/240 |

Primary Examiner—Earl C. Thomas
Attorney, Agent, or Firm—Oblong, Fisher, Spivak, McClelland & Maier

[57] ABSTRACT

In a method of cleaning a fluorine-containing waste gas evolved frm a furnace, by contacting said gas with a fluorine-reactive powder and filtering the fluorine-reactive powder by a filter, an improvement comprising cooling the waste gas to 150°–400° C; feeding a fluorine-reactive powder into the cooled waste gas; passing the cooled waste gas through a filter on which the fluorine-reactive powder is deposited so as to react with the fluorine component of the waste gas; and removing the deposited powder layer from the filter.

26 Claims, 2 Drawing Figures

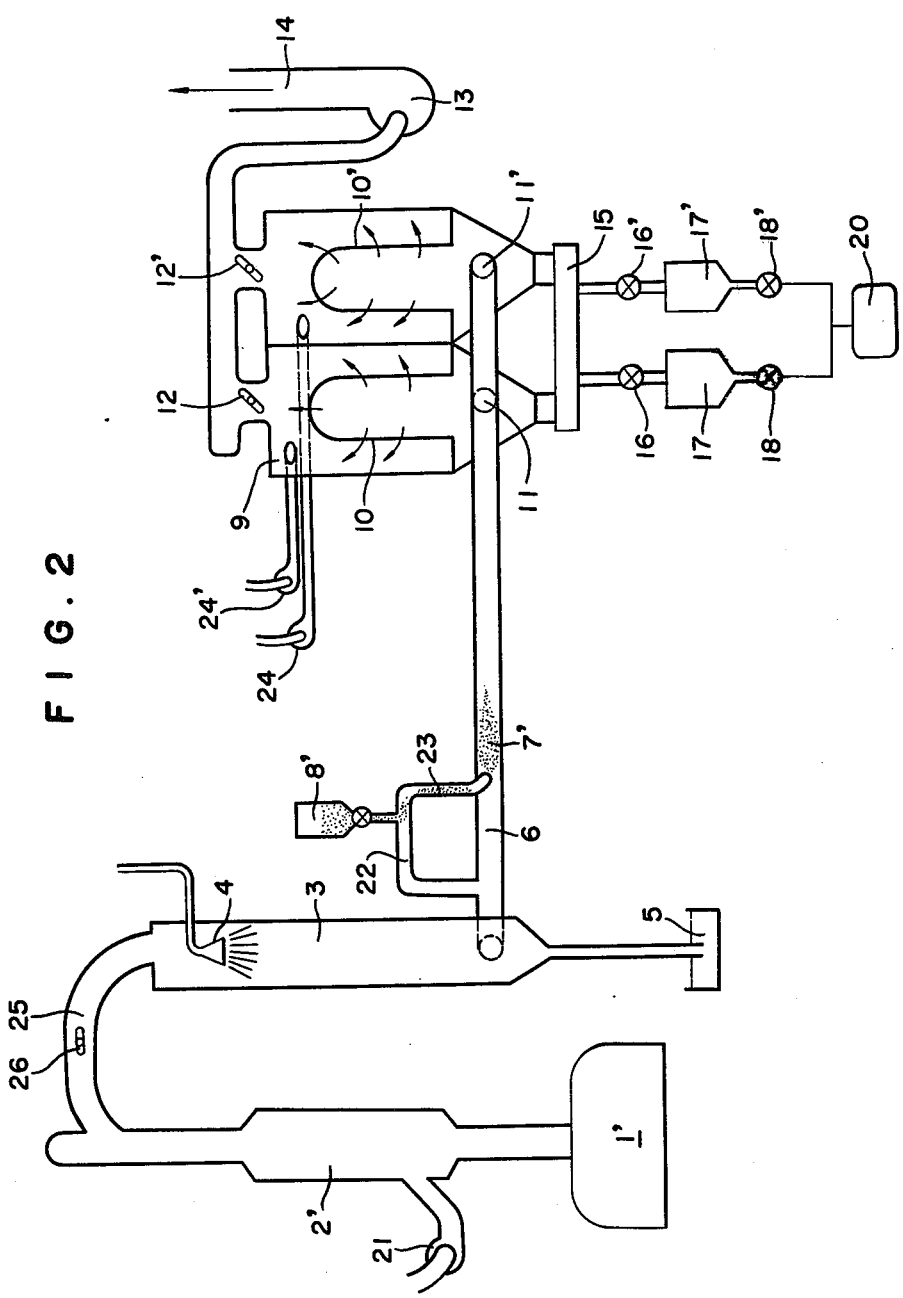

METHOD OF CLEANING WASTE GAS CONTAINING A FLUORINE COMPONENT

BACKGROUND OF THE INVENTION

1. Field of the Invention

The present invention relates to a method of cleaning a fluorinecontaining waste gas evolved from a furnace, such as a glass melting furnace, an aluminum electrolytic furnace or the like.

2. Description of Prior Art:

In the past, both a dry process and a wet process have been proposed for cleaning a waste gas containing a fluorine component. The wet process has a significant disadvantage in that it requires a secondary treatment for complete processing of a waste solution. The disadvantage of the dry process is the attendant corrosion and/or clogging of the apparatus due to condensation of $SO_2$.

In the past, numerous other processes have been proposed for removing fluorine and other toxic gas components. However, fully satisfactory results have not been attained. Previously, the inventors have developed a process for removal of toxic gas components from a waste gas by treating the waste gas and then filtering it through a bag filter. However, the fluorine gas removal coefficient of the former method is not high enough to satisfy typical air-pollution regulations. Consequently, it would be most desirable to have a process which is highly effective for removal of fluorine from a waste gas.

SUMMARY OF THE INVENTION

Accordingly, it is one object of the present invention to provide a method of cleaning a waste gas containing a fluorine component with sufficient effectiveness to satisfy air-pollution regulations.

It is another object of the present invention to improve the inventors' existing method of cleaning a high temperature waste gas containing a fluorine component evolved from a glass melting furnace, an aluminum electrolytic furnace, or the like.

It is still another object of this invention to provide a process for removing the fluorine component of a waste gas with very high efficiency and in a quite stable operation without clogging of ducts.

This and other objects of this invention, as will hereinafter be made clear by the discussion below, have been attained by providing a method of cleaning a fluorine-containing waste gas evolved from a glass melting furnace, an aluminum electrolytic furnace, or the like by cooling the hot waste gas containing the fluorine component to 150°–400° C; feeding a fluorine-reactive powder into the cooled waste gas; depositing the fluorine-reactive powder onto two or more bag filters to form fluorine-reactive powder layers; passing the waste gas through the layer of one bag to react the fluorine component in the waste gas with the fluorine-reactive powder; by passing part of the waste gas such that it passes through one of the other bag filters having a fluorine-reactive powder layer; removing the reacted powder layer from the bag filter, and recycling part of the product to the glass melting furnace, the aluminum electrolytic furnace, or the like.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
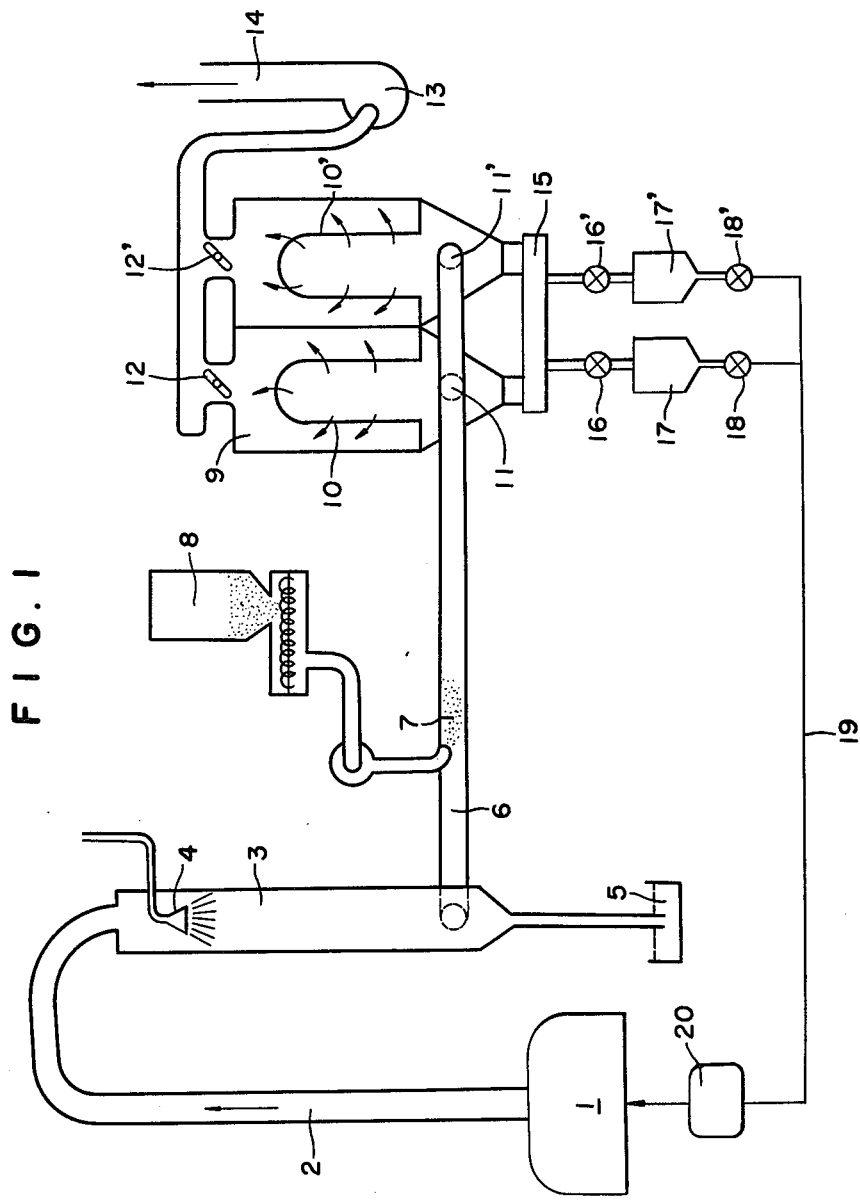
FIG. 1 is a schematic flow sheet of one embodiment of a system for applying the method of the invention; and, FIG. 2 is a schematic flow sheet of another such embodiment.

Suitable fluorine-reactive powders for use in the invention include calcium hydroxide, calcium oxide, calcium carbonate, aluminum hydroxide, or the like. It is preferred to use calcium hydroxide since its fluorine-removal coefficient is quite high; it is economical; and it is easily handled. It is also preferred to use a fine powder having a particle size of less than 200 mesh, especially less than 325 mesh.

The fluorine-reactive powder is contacted with the cooled waste gas which has been cooled by a water spray, and thus contains moisture. The fluorine-reactive powder is deposited onto the bag filter in the form of a layer having communicating holes, since the fluorine-reactive powder is moistened with steam formed in the cooling step. Suitable filters for use in the invention include those made of cotton, synthetic fiber or galss fiber. It is preferable to use a bag-type filter, especially a bag filter made of glass fiber when the temperature of the passing waste gas is high. The deposited fluorine-reactive powder layer can be easily removed from the filter by imparting a back pressure or vibration to the filter. This enables reuse of the filter and maintenance of a long filter lifetime.

One very important feature of this invention is the cooling of the waste gas to 150°–400° C, preferably 200°–400° C. When the temperature of the waste gas is lower than 150° C, sulfuric acid mist is formed causing corrosion of the apparatus. This occurs because the dewpoint of $SO_x$ is 180°–200° C. When the temperature of the waste gas is higher than 400° C, the filter bag is not durable, even when a glass fiber bag filter is employed. At the initiation of the filtration, it is preferred to preheat the filter to a temperature higher than 150° C so as to prevent the condensation of $SO_x$ and the attendant corrosion of the filter chamber and clogging of the ducts. It is also preferred to deposit some fluorine-reactive powder in the form of a layer on the filter by feeding with air before passing the waste gas. Thereby, damage to the filter due to condensation of $SO_x$ can be prevented and the initial discharge of unreacted fluorine gas can be decreased.

It is also preferred to recycle a part of the powder removed from the filter by feeding it into the waste gas stream after the cooling step, preferably at a point in the path which constitutes a by-pass for the cooled waste gas (similar to tube 22 of FIG. 2). The separated powder is preferably mixed with fresh fluorine-reactive powder. The ratio of the separated powder to the fresh fluorine-reactive powder is usually 0.1 – 10 : 1. In accordance with this embodiment, wherein a part of the separated powder is recycled at a point in the process after the cooling step, fluctuation in the component makeup of the separated powder is decreased, and the fluorine-removal coefficient of the overall process is improved because of the speedy redeposition after removing the deposited powder layer. In addition, the total consumption of fluorine-reactive powder is decreased because of high efficiency of the reaction which results from the recycling.

Referring to the drawings, several embodiments of methods of cleaning waste gas evolved from a glass melting furnace will be provided for purpose of illustration only.

Cooling Step

A waste gas 2 evolved from a glass melting furnace 1 is fed into a cooler 3 equipped with a plurality of nozzles 4 wherein the waste gas is cooled to about 150°–400° C by a water spray. The high melting-point materials contaminating the waste gas are solidified and settle at the bottom of the cooler 5 from which they are later discharged. It is possible to use various cooling methods. However, it is not preferred to use a heat exchange type cooling method since the solidified material becomes deposited on the tubes or fins and causes a decrease in the heat-exchange coefficient. Also, air-cooling methods are not preferable, because of the attendant increase in gas volume. A fin-radiation-cooling method is not preferred because of the low cooling coefficient. Accordingly, it is preferred to employ a cool water spray method. According to the following comparative tests of defluorination by the cool water spray method and the heat-exchange method using ducts, the fluorine content can be decreased to less than 1 ppm by the former method. Fluorine-containing waste gas, with a fluorine content of 200 – 230 ppm at 900° C, is passed at a rate of 14,000 Nm³/hr. through a cooler where it is cooled by a water spray flowing at a rate of 26 liter/min. or through a heat exchange at about 250° C where it is cooled. Calcium hydroxide powder is fed at a rate of 40 kg/hr so as to come into contact with the cooled waste gas stream before the latter is filtered through the bag filter. The waste gas contained a fluorine content of less than 1 ppm when treated by the water spray method and about 3 ppm when treated by the heat-exchange method.

Fluorine-Reactive Powder Feeding Step

The waste gas discharged from the color 3 is passed through a duct 6 into a bag house 9. The fluorine-reactive powder, e.g., calcium hydroxide powder, is fed into the duct 6 in order to expose the powder to the cooled waste gas. The fluorine-reactive powder can be stored and fed by any convenient method. In FIG. 1, the powder is transferred from a storage tank 8 by a screw conveyor and is fed to the inlet 7 of the fluorine-reactive powder system in the duct 6 by an air-pump. It is also possible to use any other type of appropriate apparatus.

In FIG. 2, a simple type feeder is employed. The fluorine-reactive powder is fed from a storage tank 8' to a by-pass 22 of the duct 6 with or without a fan. When the fluorine-reactive powder preliminarily is exposed to air or the waste gas, it is possible to mix it uniformly and to maintain constant content in the gas stream. This also prevents clogging of the inlet of the fluorine-reactive powder.

In this step, it is preferred to feed the fluorine-reactive powder at a molar ratio of 1.5 – 10 relative to the fluorine component in the waste gas. When the molar ratio is lower than 1.5, a high content of unreacted fluorine is discharged. When the molar ratio is greater than 10, the filter coefficient is decreased, but the content of unreacted fluorine is not further decreased. This is also economically disadvantageous, since a large amount of the fluorine-reactive powder is required. When the molar ratio is about 1.5, a waste gas fluorine content of 200 ppm can be decreased to less than 3 ppm. When the molar ratio is about 5, a fluorine content of 200 ppm can be decreased to less than 0.5 ppm.

When a waste gas, having a fluorine content of 200 – 250 ppm, evolved from a glass melting furnace at 900° C is cooled to 250° C by a water spray at the rate of 14,000 Nm³/hr., and calcium hydroxide powder (325 mesh pass) is fed into the stream of the cooled waste gas and is filtered by a glass fiber bag filter, the results are as follows:

| No. | Feed ratio of Ca(OH)$_2$ powder Ca/F (molar ratio) | Content of fluorine in waste gas (ppm) |
|---|---|---|
| 1 | 1 | 10 – 50 |
| 2 | 1.2 | 1 – 20 |
| 3 | 1.5 | 0.5 – 3 |
| 4 | 5 | 0.5 > |
| 5 | 10 | 0.5 > |
| 6 | 15 | 0.5 > |

Filtering Step

The waste gas contaminated with the fluorine-reactive powder is fed from inlets 11, 11' to a bag house 9 and is filtered through glass fiber bag filters 10, 10'. The fluorine-reactive powder is deposited on the bag filters whereby reaction with the fluorine component in the waste gas ensues. This removes the fluorine component as CaF$_2$, etc. The filtered waste gas is discharged from outlets 12 and 12' from where it leaves through a chimney 14 with or without a fan 13. The fluorine component in the waste gas is effectively removed in this step wherein the waste gas passes the deposited fluorine-reactive powder layer. This is illustrated by the case where the bag filter is broken. Accordingly, it is clear that the reaction of the fluorine component with the deposited fluorine-reactive powder layer is quite important for increasing the fluorine-removal coefficient.

Recovering Step

When the deposited layer consisting of the unreacted fluorine-reactive powder, e.g., Ca(OH)$_2$, and the reacted product, e.g., CaF$_2$, builds up on the bag filter, the deposited layer should be removed and allowed to settle at the bottom of the bag house. When this is done, the dampers of the inlet 11 and the outlet 12 are closed, and the deposited layer is removed and falls to the bottom 15 of the bag house. The fallen powder is fed through a recovering valve 16 to a silo 17. In the operation of removing the deposited layer, it is not preferred to stop all treatment of the waste gas. It is preferred to stop only one of the bag filter operations and continue to pass the waste gas through the other bag filter in normal cleaning operation. In the apparatus of FIG. 1, the deposited layers on the right bag filter and on the left bag filter are alternatively removed while continually passing the waste gas through the other bag filter. When a bag house having four bag filter chambers is used, the filtration is carried out through three bag filter chambers while the removed operation is carried out in the remaining one bag filter chamber. In the embodiment of FIG. 1, only one bag filter is disposed in each bag filter chamber. However, it is customary to dispose a plurality of bag filters, such as 10 – 100 bag filters, in each bag filter chamber. Moreover, it is customary to use a plurality of bag filter chambers, such as 3 – 20 bag filter chambers, in the bag house. In such an embodiment, one or two bag filter chambers are sequentially stopped for the removal operation. The number of bag filters and bag filter chambers are determined by the desired recovering operation time and a filtering velocity. This, in turn, is determined by the waste gas volume, the fluorine content, the flourine-reactive powder feed rate and the surface area of the bags.

It is possible to employ any conventional method for removing the deposited layer. It is preferred to employ a back-pressure method in which the deposited layer is removed by passing air through the bag filter from the opposite direction. Since the deposited layer is made of $Ca(OH)_2$ and $CaF_2$ or the like, and is in dry condition at a temperature higher than 150° C, the deposited layer is easily removed without damage to the bag filter. When the waste gas evolved from the glass melting furnace is treated with calcium hydroxide, the fallen powder is fed through the valve 18 of the silo 17 to a storage tank 20 where it can be used as a starting material for the glass production or, as mentioned above, can be partially recycled with the waste gas. The amount of $Ca F_2$ produced can be determined from the content of fluorine in the waste gas and the amount of calcium hydroxide fed into the duct. However, it is preferred to use the recovered powder after analyzing its actual component makeup, since the fluorine content is not always constant and other impurities in the waste gas, e.g., $SO_x$, are also recovered. The high melting point material recovered in the cooling step can also be employed as a starting material for the glass. Consequently, when used with a glass melting furnace, the advantages of the method of this invention are very great and the waste problem is minor.

When all of the deposited layer on the filter bag is removed, the time required for resuming the treatment is shortened. However, a waste gas containing a relatively large content of unreacted flourine is disadvantageously discharged. In order to maintain a high fluorine removal coefficient, it is preferred to leave a part of the deposited layer on the bag filter. When a deposited layer having an average thickness of more than 5 mm remains, the effect on the removal operation is not serious. Also, when a deposited layer having an average thickness of more than 7 mm remains, no problems at all occur. Since it is impossible to remove the deposited layer uniformly, fluctuations in the thickness of the remaining deposited layer occur. However, as long as the thickness of the remaining deposited layer averages about 5 mm, fluctuation of thickness is allowable. When a deposited layer having a thickness of 7 mm remains after the removal operation, and calcium hydroxide is added at a rate of 50 kg/hr. to a waste gas containing 200 ppm of a fluorine component flowing at a rate of 1400 Nm³/hr., the fluorine content in the filtered waste gas at the initiation of the process is about 1 ppm. On the other hand, when a deposited layer having a thickness of 5 mm remains, the fluorine content in the filtered waste gas can be decreased to 1 ppm within a short period from the time of the initiation of the process. Even when the deposited layer is more substantially removed, a part of the deposited powder remains in the filter. In this case, a high fluorine content is found in the filtered waste gas throughout certain periods of time after the initiation of the process. However, this period is quite short compared with the full operation time. Accordingly, the desirable thickness of the remaining deposited layer can be selected in conjunction with the requirements of any particular process.

On the other hand, it is preferred to remove the deposited layer in thicknesses of less than 5 mm at a time. When a deposited layer having a thickness of more than 5 mm is removed at once, there is a possibility that a waste gas containing more than 5 ppm, sometimes about 20 ppm, of unreacted fluorine will be filtered. However, when a deposited layer having a thickness of less than 5 mm is removed at once, the content of fluorine in the filtered waste gas is not substantially increased.

Referring to FIG. 2, another embodiment of the invention is illustrated. The fluorine-containing waste gas evolved from a furnace 1' is precooled in a recuperator tube 2' by feeding air 21. This prevents solidification and deposition of high melting point material on the walls of the duct 25. For example, in a conventional glass melting furnace used to prepare glass fiber, a relatively large amount of high melting point material is vaporized and is condensed by cooling. It then solidifies on the wall of the ducts while passing through at 700°–1100° C. Accordingly, the duct becomes clogged in a long-term operation. Therefore, it is necessary to clean the duct by shutting a damper 26. The operation is dangerous and untreated waste gas is discharged during the cleaning operation. On the other hand, when the waste gas is precooled to about 500°–600° C, most of the high melting-point materials are solidified to form a powder whereby there is no deposition in the ducts and the powder can be easily removed from the bottom of the color 3.

The appropriate temperature for precooling is dependent upon the kinds of high melting point materials in the waste gas. It is possible to cool by employing air feeding apparatus as well as other conventional apparatus. It is preferred to use apparatus which does not cause a fluctuation in the pressure and temperature of the furnace and which does not cause a substantial increase in volume of the gas treated. When the length of the duct is short or the maintenance of furnace temperature throughout the duct is complete, it is unnecessary to employ the precooling operation. To the contrary, when the length of the duct is long or the maintenance of temperature is not complete, thereby producing a relatively large amount of high melting point material in the waste gas, it is preferred to employ the precooling operation.

The waste gas passed through the duct is cooled to 150°–400° C in the cooler, and the solidified high melting point material having a relatively large size is discharged from the bottom of the cooler. The cooled waste gas is passed through the path 6 to the bag filter. Part of the waste gas is passed to a by-pass 22. Calcium hydroxide powder is fed into the by-pass 22 whereby it is pre-exposed to the waste gas as a premix 23. Then it is fed through an inlet 7' to the path 6 in order to uniformly disperse the calcium hydroxide powder in the waste gas. The waste gas is passed through inlets 11 and 11' of the bag house 9 and is filtered through bag filters 10 and 10' to complete the reaction, It is then discharged from the outlets 12 and 12' of the bag house. The deposited powder layer on the bag filter is removed by back-pressure from the air pumps 24 and 24'. For example, when the filtering coefficient is decreased by deposition of powder on the bag filter 10, the inlet 11 and the outlet 12 of the bag house are shut by the dampers. The valve (16) for recovering the deposited powder is opened and back-pressure is applied to the bag filter 10 by an air-pump 24. This causes the deposited powder layer on the bag filter 10 to settle. The fallen powder is fed to a silo 17 and is transferred to a storage tank 20 by opening a silo valve 18.

In accordance with the invention, it is possible to decrease not only the fluorine component of a waste gas but also $SO_x$ ($SO_2$, $SO_3$) which are removed as $CaSO_4$, and soot. For example, 1000–1500 ppm of $SO_2$ can be decreased to less than 400 ppm of $SO_2$ by treatment with the apparatus of FIG. 1.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a method of cleaning a fluorine-containing waste gas evolved from a furnace, by contacting said gas with a fluorine-reactive powder and filtering the fluorine-reactive powder by a filter, an improvement which comprises cooling the waste gas to 150°–400° C with a water spray;
   feeding a fluorine-reactive powder into the cooled waste gas;
   passing the cooled waste gas through a filter on which the fluorine-reactive powder is deposited so as to react with the fluorine component of the waste gas; and
   removing the deposited powder layer from the filter.

2. The method of claim 1, wherein the fluorine-reactive powder is a fluorine-reactive calcium compound applied in a molar ratio of 1.5–10 relative to the amount of the fluorine component in the waste gas.

3. The method of claim 1, wherein the cooled waste gas is passed through a filter on which the fluorine-reactive powder is already deposited.

4. The method of claim 1, wherein a plurality of filters is used and wherein fluorine-reactive powder is pre-deposited onto the filters with air and wherein the waste gas is continually passed through all except one filter during the time the reacted powder layer is removed from the one filter.

5. The method of claim 1, wherein the deposited powder layer is removed such that a residual layer having an average thickness of more than 5 mm remains.

6. The method of claim 1, wherein the deposited powder layer on the filter is removed by applying back-pressure.

7. The method of claim 1, wherein a part of the deposited powder layer having a thickness of less than 5 mm is removed while a residual deposited powder layer having a thickness of more than 5 mm remains.

8. The method of claim 1, wherein the filter is a bag filter made of glass fiber.

9. The method of claim 1, wherein waste gas evolved from a glass melting furnace is treated.

10. The method of claim 9, wherein waste gas evolved from a glass melting furnace is treated and the powder material removed from the filter is recycled as a raw material for the glass production.

11. The method of claim 1, wherein the filter is preheated to 150° C before the filtration.

12. The method of claim 1, wherein fluorine-reactive powder is deposited on the filter before the filtration.

13. In a method of cleaning a fluorine-containing waste gas evolved from a furnace, by contacting it with a fluorine-reactive powder and filtering the fluorine-reactive powder by a filter, an improvement which comprises cooling the waste gas to 150°–400° C by a water spray; feeding into the cooled waste gas an active calcium compound powder at a molar ratio of 1.5–10 relative to the fluorine component; passing the waste gas through a filter on which the fluorine-reactive powder is deposited so as to react with the fluorine component; and
   removing the deposited powder layer from the filter.

14. In a method of cleaning a fluorine-containing waste gas evolved from a furnace by contacting it with a fluorine-reactive powder and filtering the fluorine-reactive powder by a filter, an improvement which comprises cooling the waste gas to 150°–400° C by a water spray;
   feeding into the cooled waste gas an active calcium hydroxide powder, at a molar ratio of 1.5–10 relative to the fluorine component;
   passing the waste gas through a glass fiber bag filter on which the fluorine-reactive powder is deposited so as to react with the fluorine component; and
   removing from the filter part of the deposited powder layer having a thickness of less than 5 mm while a residual deposited powder layer having a thickness of more than 5 mm remains.

15. The method of claim 1, wherein a part of the separated powder obtained from the deposited powder layer is recycled by feeding it into the waste gas path after the cooling step.

16. The method of claim 1, wherein a part of the separated powder is fed along with the fresh fluorine-reactive powder.

17. The method of claim 1, wherein some of the cooled waste gas is by-passed and the fluorine-reactive powder is fed in the by-pass.

18. The method of claim 19, wherein a part of a separated powder obtained from the deposited powder layer is recycled by feeding it through the by-pass.

19. The method of claim 17, wherein the ratio of the separated powder recycled to the fluorine-reactive powder is 0.1–10:1 by weight.

20. In a method of cleaning a fluorine-containing waste gas evolved from a furance and containing components having a melting point above about 500°–600° C by contacting said gas with fluorine-reactive powder and filtering the fluorine-reactive powder by a filter, the improvement which comprises precooling said waste gas to 500°–600° C in a duct before entering the cooler to solidify the components of said waste gas having a melting point above said precooling temperatures, then further cooling the waste gas to 150°–400° C in a cooler with a waste spray;
   feeding a fluorine-reactive powder into the cooled waste gas;
   passing the cooled waste gas through a filter on which the fluorine-reactive powder is deposited so as to react with the fluorine component of the waste gas; and
   removing the deposited powder layer from the filter.

21. In a method of cleaning a fluorine-containing waste gas evolved from a furnance, by contacting said gas with a fluorine-reactive powder and filtering the fluorine-reactive powder by a filter, an improvement which comprises cooling the waste gas to 150°–400° C with a water spray;
   by-passing some of the cooled waste gas;

feeding a fluorine-reactive powder into the cooled by-passed waste gas;

introducing said cooled by-passed waste gas containing the fluorine-reactive powder into the cooled waste gas stream;

passing the cooled waste gas through a filter on which the fluorine-reactive powder is deposited so as to react with the fluorine component of the waste gas;

removing the deposited powder layer from the filter; and recycling a part of said removed powder by feeding it to the cooled waste gas along with the fresh, fluorine-reactive powder.

22. The method of claim 20, wherein a part of the separated powder obtained from the deposited powder layer is recycled by feeding it into the waste gas path after the cooling step.

23. The method of claim 20, wherein a part of the separated powder is fed along with the fresh fluorine-reactive powder.

24. The method of claim 20, wherein some of the cooled waste gas is by-passed and the fluorine-reactive powder is fed in the by-pass.

25. The method of claim 24, wherein a part of a separated powder obtained from the deposited powder layer is recycled by feeding it through the by-pass.

26. The method of claim 25, wherein the ratio of the separated powder recycled to the fluorine-reactive powder is 0.1 – 10:1 by weight.

* * * * *